United States Patent
Weissmann et al.

(10) Patent No.: US 9,075,610 B2
(45) Date of Patent: Jul. 7, 2015

(54) METHOD, APPARATUS, AND SYSTEM FOR ENERGY EFFICIENCY AND ENERGY CONSERVATION INCLUDING THREAD CONSOLIDATION

(75) Inventors: Eliezer Weissmann, Haifa (IL); Efraim Rotem, Haifa (IL); Avinash N. Ananthakrishnan, Hillsboro, OR (US); Alon Naveh, Ramat Hasharon (IL); Hisham Abu Salah, Majdal shams (IL); Nadav Shulman, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 13/327,692

(22) Filed: Dec. 15, 2011

(65) Prior Publication Data

US 2012/0185709 A1 Jul. 19, 2012

(51) Int. Cl.
*G06F 1/26* (2006.01)
*G06F 1/32* (2006.01)

(52) U.S. Cl.
CPC ............ *G06F 1/3243* (2013.01); *G06F 1/3234* (2013.01); *Y02B 60/32* (2013.01); *Y02B 60/1239* (2013.01)

(58) Field of Classification Search
CPC ........... G06F 1/32; G06F 1/324; G06F 1/329; G06F 1/3203; G06F 1/3234; G06F 1/3287; G06F 1/3293; G06F 9/5077; G06F 9/5094; G06F 9/4533; G06F 9/5083; G06F 9/4856; G06F 9/50; G06F 9/505; G06F 9/5061; G06F 9/5088; Y02B 60/142; Y02B 60/144; Y02B 60/148; Y02B 60/162
USPC .......... 713/300, 320, 322, 323, 324; 718/100, 718/102, 104, 105, 107, 108
See application file for complete search history.

(56) References Cited

U.S. PATENT DOCUMENTS

| | | | |
|---|---|---|---|
| 8,533,719 B2 * | 9/2013 | Fedorova et al. ............. | 718/102 |
| 2010/0037038 A1 * | 2/2010 | Bieswanger et al. ......... | 712/220 |
| 2010/0146513 A1 * | 6/2010 | Song ............................. | 718/104 |
| 2011/0055838 A1 * | 3/2011 | Moyes .......................... | 718/102 |
| 2011/0219246 A1 * | 9/2011 | Arai ............................. | 713/320 |
| 2011/0246995 A1 * | 10/2011 | Fedorova et al. ............. | 718/103 |
| 2012/0137289 A1 * | 5/2012 | Nolterieke et al. ............... | 718/1 |
| 2012/0272243 A1 * | 10/2012 | Nolterieke et al. ............... | 718/1 |
| 2012/0284549 A1 * | 11/2012 | Abdul et al. .................. | 713/323 |

\* cited by examiner

*Primary Examiner* — Mohammed Rehman
(74) *Attorney, Agent, or Firm* — Trop, Pruner & Hu, P.C.

(57) ABSTRACT

An apparatus, method and system is described herein for thread consolidation. Current processor utilization is determined. And consolidation opportunities are identified from the processor utilization and other exaction parameters, such as estimating a new utilization after consolidation, determining if power savings would occur based on the new utilization, and performing migration/consolidation of threads to a subset of active processing elements. Once the consolidation is performed, the non-subset processing elements that are now idle are powered down to save energy and provide an energy efficient execution environment.

19 Claims, 6 Drawing Sheets

METHOD, APPARATUS, AND SYSTEM FOR ENERGY EFFICIENCY AND ENERGY CONSERVATION INCLUDING THREAD CONSOLIDATION

FIELD

This disclosure pertains to energy efficiency and energy conservation in integrated circuits, as well as code to execute thereon, and in particular but not exclusively, to thread consolidation.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computers consume a substantial amount of the entire electricity supply for the United States of America.

As a result, there is a vital need for energy efficiency and conservation associated with integrated circuits. And as servers, desktop computers, notebooks, ultrabooks, tablets, mobile phones, processors, embedded systems, etc. become even more prevalent (from inclusion in the typical computer, automobiles, and televisions to biotechnology), the effect of computing device sales stretches well outside the realm of energy consumption into a substantial, direct effect on economic systems. When power consumption becomes more of a factor, the trend towards always increasing performance is to be counterbalanced with power consumption concerns.

Sometimes during operation of a processor, not all of the processor is being utilized (e.g. not all available hardware threads are in operation simultaneously). In fact, current Operating System (OS) schedulers typically spread out work among available processing elements (e.g. among cores) to ensure the highest performance (i.e. each core is dedicated to working on a smaller portion of a multithreaded workload). And only when all cores are active and have work, does the OS scheduler begin to schedule more work to a core. As a result, even though a smaller number of processing elements, such as cores, may be able to accommodate a workload, all the cores remain active to ensure performance. Therefore, as can be seen, current physical processors do not include a specific mechanism to support weighing power versus performance in regards to thread scheduling.

BRIEF DESCRIPTION OF THE DRAWINGS

The present invention is illustrated by way of example and not intended to be limited by the figures of the accompanying drawings.

DETAILED DESCRIPTION

Figure 1:
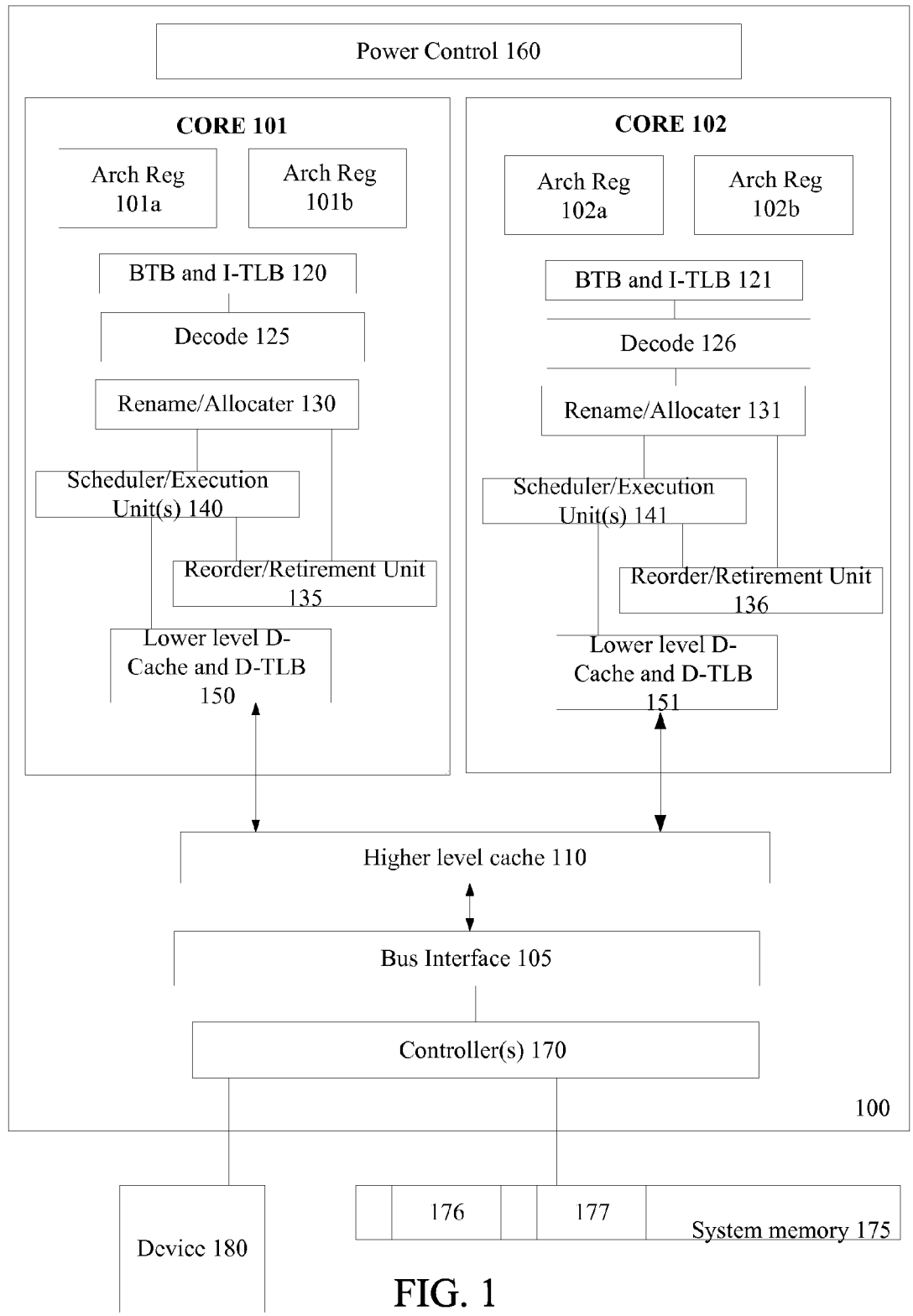
FIG. 1 illustrates an embodiment of a logical representation of a system including processor having multiple processing elements (2 cores and 4 thread slots).

In the following description, numerous specific details are set forth, such as examples of specific types of processor and system configurations, specific hardware structures, specific architectural and micro architectural details, specific register configurations, specific methods of measuring and estimating processing element activity, specific, specific core and thread configurations, specific modules, specific activity metrics, specific activity thresholds and ranges, specific numbers or cores and hardware threads, etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic for activity measurement, specific migrations and context switching techniques, specific power states and gating techniques/logic, specific power consumption measurement and estimation, specific Operating System (OS) scheduler techniques and frequency requirements, and other specific operational details of processors haven't been described in detail in order to avoid unnecessarily obscuring the present invention.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

The method and apparatus described herein are for thread consolidation to provide energy efficient power savings. Specifically, thread consolidation is primarily discussed below in reference to a multi-core microprocessor; and power savings therein. Yet, the apparatus' and methods described herein are not so limited, as they may be implemented in conjunction with any integrated circuit device. For example, the thread consolidation techniques described below may be utilized in a multi-core graphics processor that executes multiple threads. In other words, the methods, apparatus' and techniques discussed throughout may be utilized with any device that includes multiple processing elements to handle multiple software threads. For example, it may be utilized in small form-factor devices, handheld devices, SOCs, or embedded applications, as discussed above. Moreover, thread consolidation techniques could be employed in a multiprocessor system (e.g. software threads are consolidated from or accumulated within physical processors in a computing platform, instead of between processing elements of single device).

Referring to FIG. 1, an embodiment of a processor including multiple cores is illustrated. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread that is part of a thread set of a core are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocator logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first Instruction Set Architecture (ISA), which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105. Historically, controller 170, which is described in more detail below, has been included in a computing system external to processor 100. In this scenario, bus interface 105 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as mutli-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include dynamic random access memory (DRAM), static RAM (SRAM), non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 170 is illustrated as part of processor 100. Recently, as more logic and devices are being integrated on a single die, such as System on a Chip (SOC), each of these devices may be incorporated on processor 100. For example in one embodiment, memory controller hub 170 is on the same package and/or die with processor 100. Here, a portion of the core (an on-core portion) includes one or more controller(s) 170 for interfacing with other devices such as memory 175 or a graphics device 180. The configuration including an interconnect and controllers for interfacing with such devices is often referred to as an on-core (or un-core configuration). As an example, bus interface 105 includes a ring interconnect with a memory controller for interfacing with memory 175 and a graphics controller for interfacing with graphics processor 180. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

In one embodiment, processor 100 is capable of consolidating threads among processing elements. Or in other embodiment, processor 100 is able to support software (e.g. and Operating System) in migrating/consolidating threads among processing elements. For example, when processor 100 is lightly loaded, it's able to migrate threads to a smaller number of cores, such that other cores are able to be powered down for energy efficient power savings. In this scenario, processor 100 first identifies thread consolidation opportunities. Here, such opportunities may exist merely when hardware thread slots are available (e.g. hardware thread slots 101a and 102a are occupied, while thread slots 101b and 102b are available). So in the simplistic case, a thread consolidation opportunity exists, where all current active threads may be migrated to either core 101 or core 102. And the remaining core (without any active threads executing) may be powered down.

However, the identification and determination of opportunities to migrate threads, in one embodiment, is more in depth. For example, identification may take into account a single or combination of factors, such as processing element availability, processing element activity, thermal ramifications of consolidation, power consumptions increase/decrease from consolidation, core/thread activity from thread consolidation, frequency increase/decrease from consolidation, etc. As a specific illustrative example, assume that hardware thread 101a and 101b are occupied with software threads. Here, current thread utilization (e.g. a number of cycles active over a period of time) of thread 101a and 101b is determined. And from that current thread utilization, it's estimated/predicted what the new thread utilization (and/or power consumption) would look like after a consolidation of threads to one core, such as core 101. From the new thread utilization and/or power consumption (e.g. power consumption would be less after consolidation), it's determined that there is an opportunity for thread 101b to be migrated to core 101 to save power, while still being able to accommodate the current workload on processor 100.

From the illustrative example, it can be seen how the identification of migration and consolidation opportunities may be simple or complex. In the above scenario, the consolidation decision is made based on an estimate of a power effect of thread accumulation on core 101, which is determined from a power impact of powering down core 102 versus increases frequency of core 101 to handle the accumulated workload; some of which is migrated from core 102 before powering down. However, in conjunction with pure energy efficiency, a thermal consideration (e.g. thermal density power—TDP—limit), performance effect (latency of migrating threads) or any other known factor may taken into account for the consolidation decision.

Moreover, the information utilized in the decision may come from many different sources. An illustrative example of a potential multitude of sources include: hardware/firmware/software to measure current thread utilization; microcode or other software to determine if the current thread initialization includes an opportunity for consolidation based on frequency policies from an operating system and scalability for frequency change of the current workload from empirical measurement and/or software thread communication; and a firmware power control unit 160 (microcontroller and associated power code) to provide power down and consumption characteristics, as well as actual powering down of core 102, etc.

Although this example is purely illustrative, it does demonstrate how the techniques described herein may be implemented in hardware, firmware, software, or a combination thereof.

Additionally, the algorithms for making a consolidation decision are not limited to those described herein, as they may vary from the simplistic availability examples described above to the detailed mathematical equations for estimating thread activity/utilization given below. For example, in addition to (or instead of) measuring/determining current thread utilization, software threads themselves may provide utilization indicators (e.g. a hint from a software thread to indicate if more or less work with regard to the measured activity is expected in the next quantum of time, which thread consolidation policies may take into account). As another example, the output of the algorithms for making a consolidation decision may be taken as a hint by software (e.g. an OS scheduler), which makes the consolidation decision.

Figure 2:
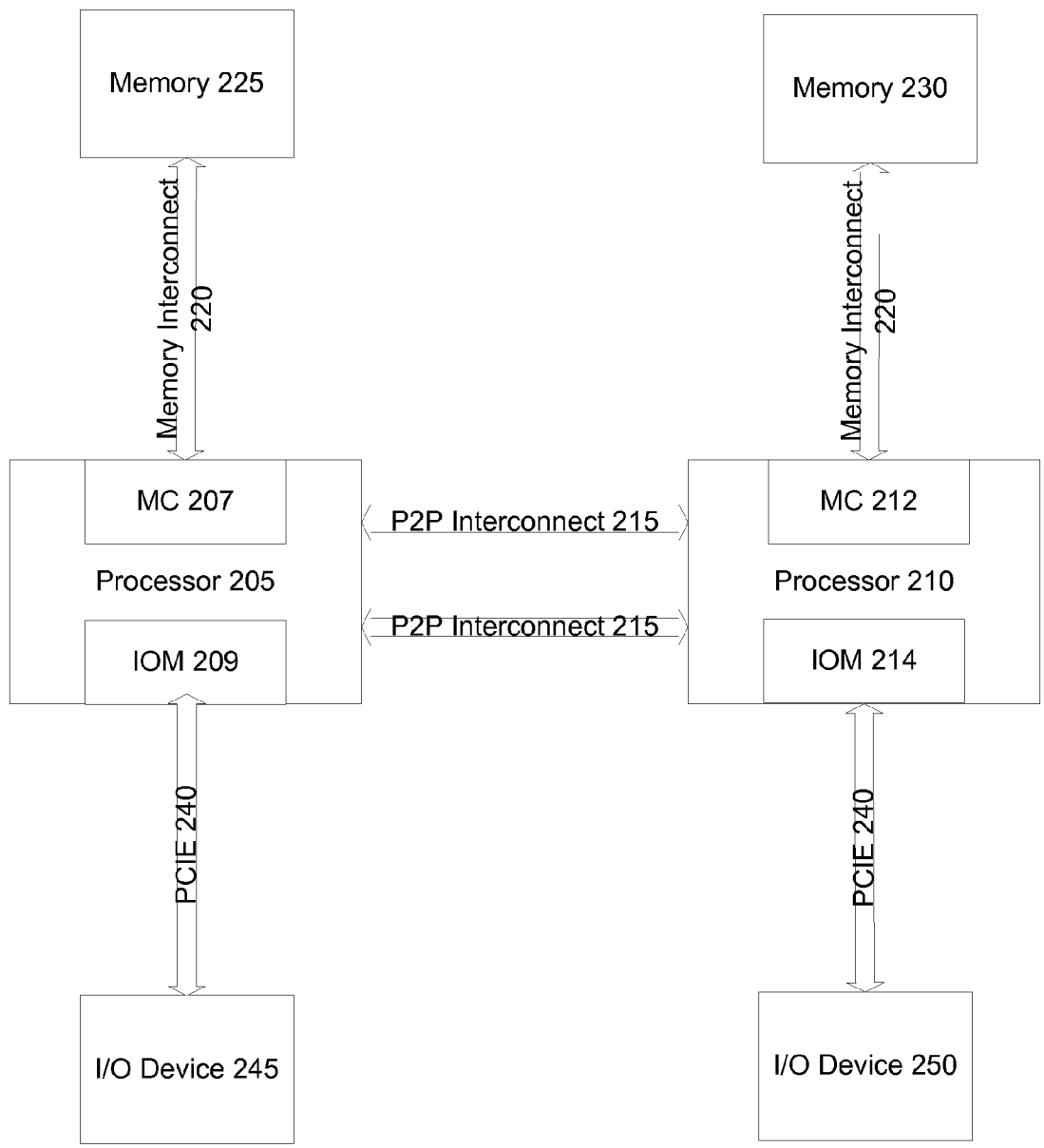
FIG. 2 illustrates an embodiment of a logical representation of a computer system configuration.
Figure 3:
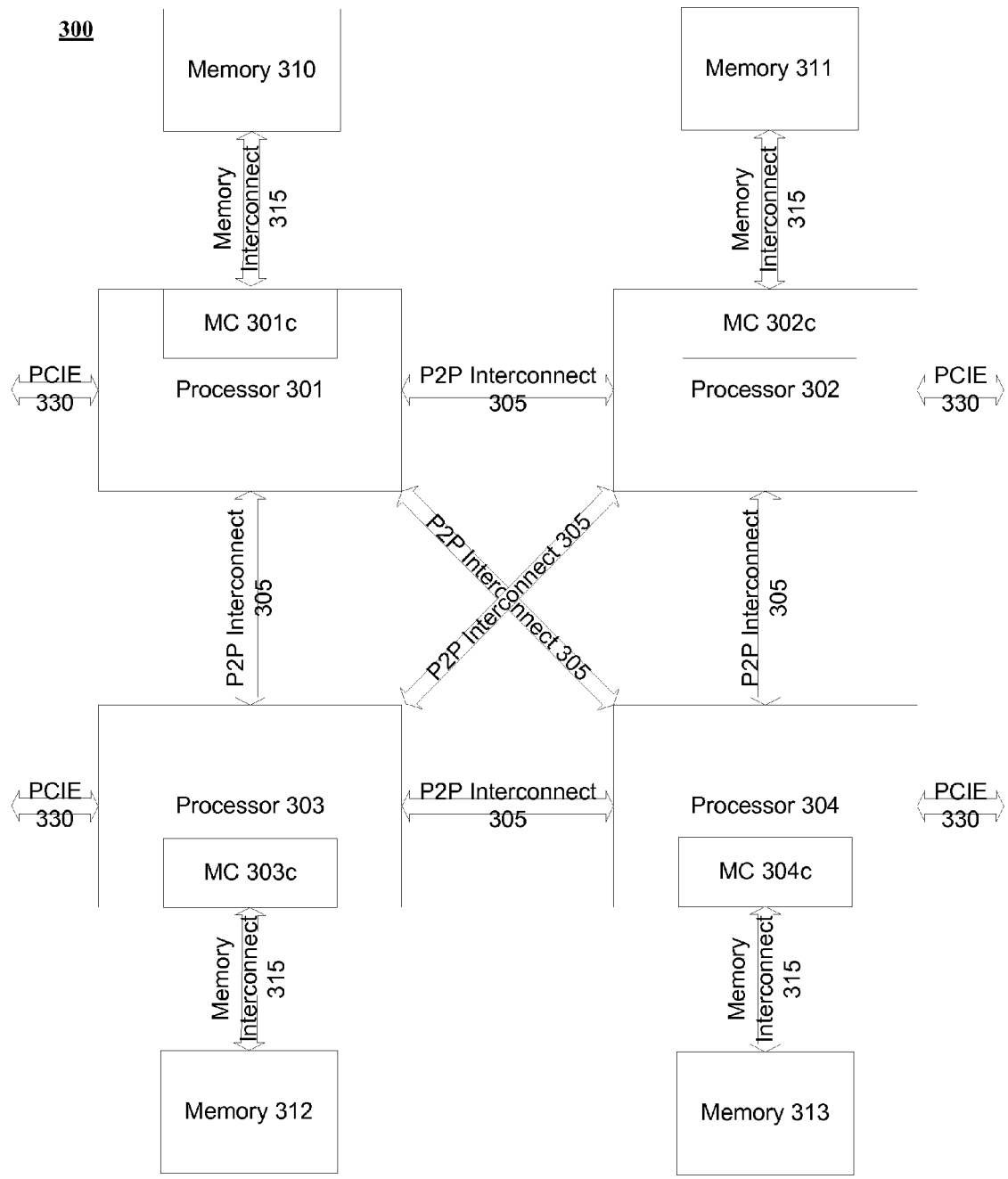
FIG. 3 illustrates another embodiment of a logical representation of a computer system configuration.
Figure 4:
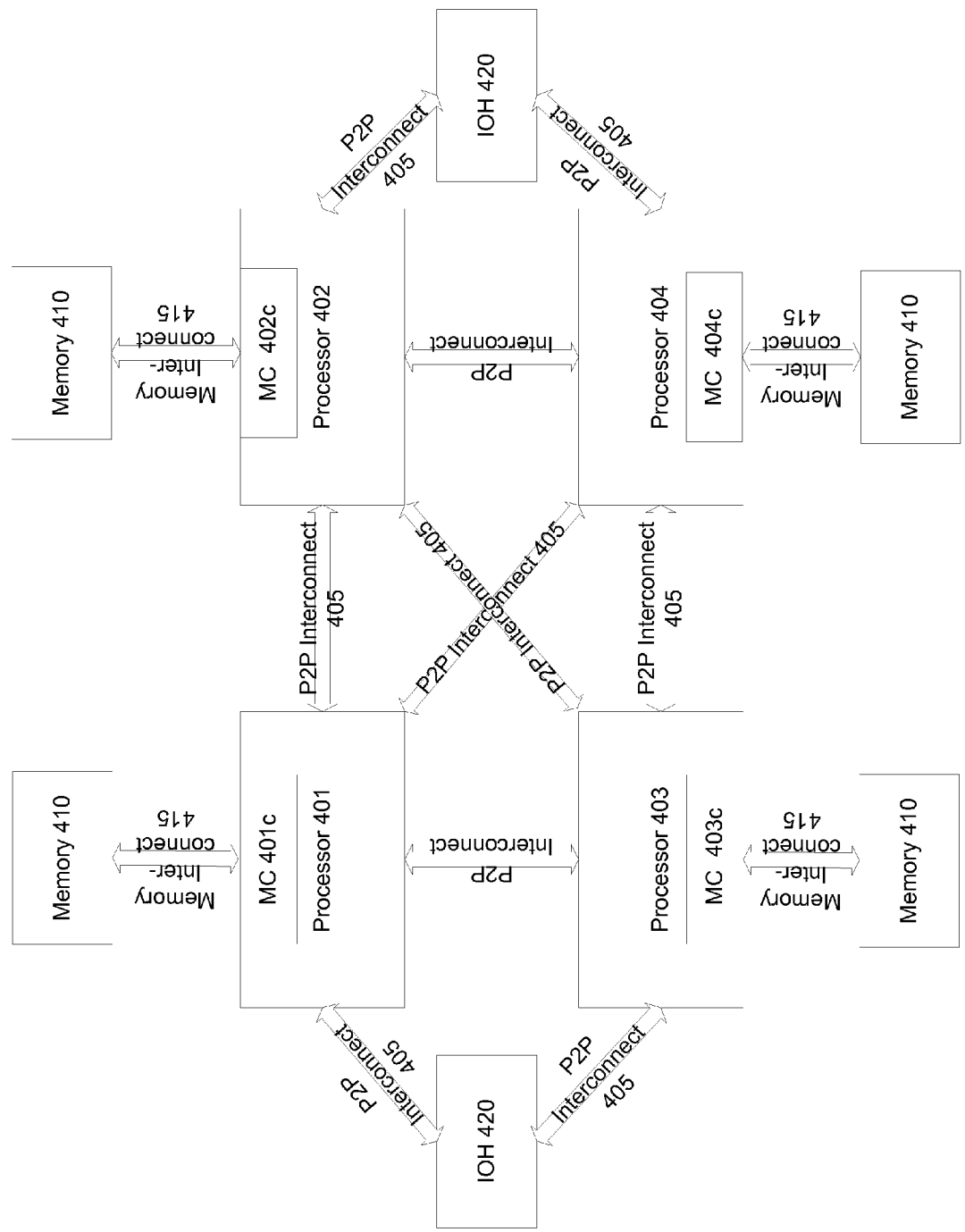
FIG. 4 illustrates another embodiment of a logical representation of a computer system configuration.

Referring to FIGS. 2-4, embodiments of a computer system configurations adapted to include processors capable of thread consolidation is illustrated. In reference to FIG. 2, an illustrative example of a two processor system 200 with an integrated memory controller and Input/Output (I/O) controller in each processor 205, 210 is illustrated. Although not discussed in detail to avoid obscuring the discussion, platform 200 illustrates multiple interconnects to transfer information between components. For example, point-to-point (P2P) interconnect 215, in one embodiment, includes a serial P2P, bi-directional, cache-coherent bus with a layered protocol architecture that enables high-speed data transfer. Moreover, a commonly known interface (Peripheral Component Interconnect Express, PCIE) or variant thereof is utilized for interface 240 between I/O devices 245, 250. However, any known interconnect or interface may be utilized to communicate to or within domains of a computing system.

Turning to FIG. 3 a quad processor platform 300 is illustrated. As in FIG. 2, processors 301-304 are coupled to each other through a high-speed P2P interconnect 305. And processors 301-304 include integrated controllers 301c-304c. FIG. 4 depicts another quad core processor platform 400 with a different configuration. Here, instead of utilizing an on-processor I/O controller to communicate with I/O devices over an I/O interface, such as a PCI-E interface, the P2P interconnect is utilized to couple the processors and I/O controller hubs 420. Hubs 420 then in turn communicate with I/O devices over a PCIE-like interface.

Figure 5:
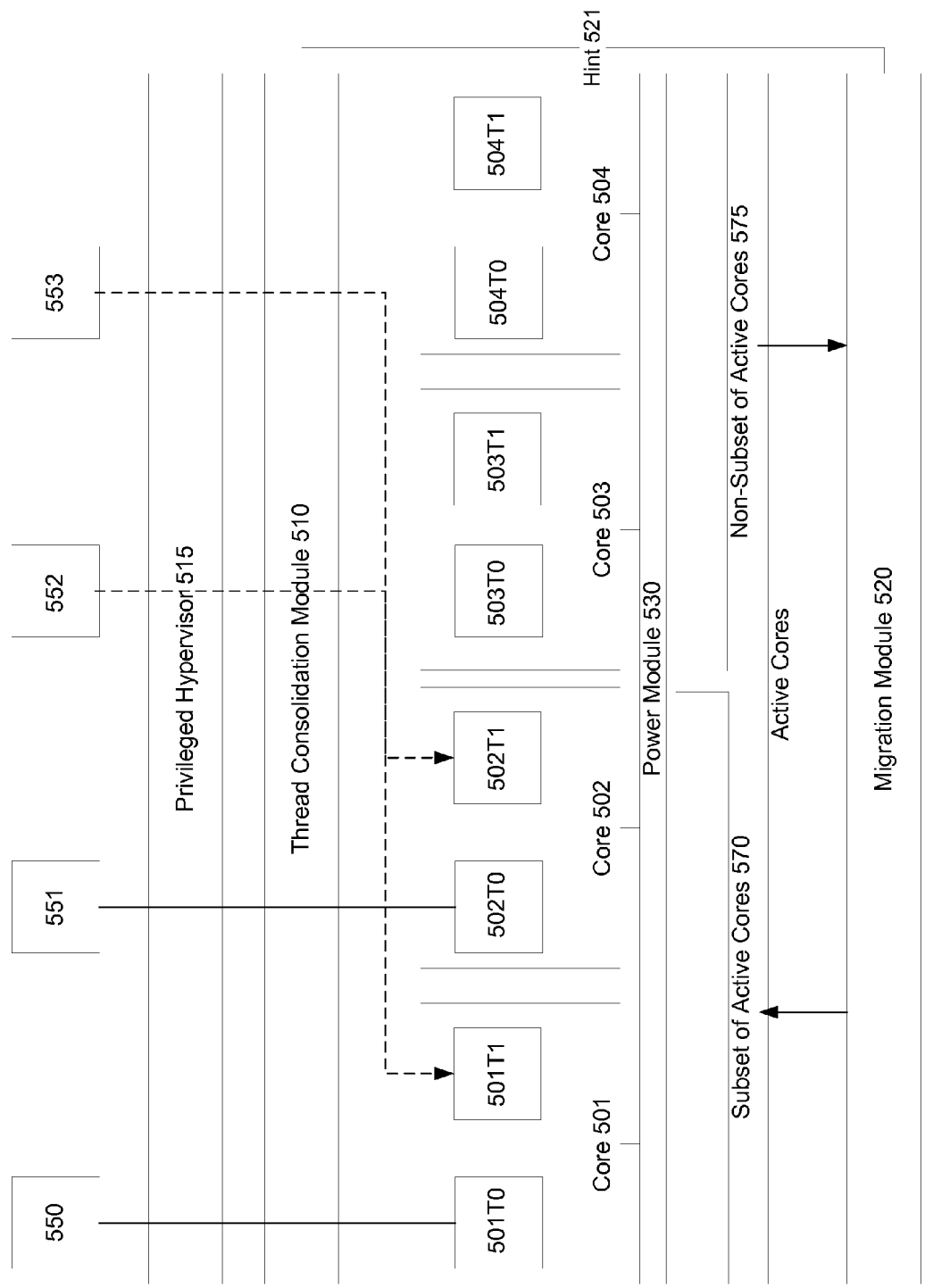
FIG. 5 illustrates an embodiment of a logical representation of a device adapted to consolidate software threads to a subset of processing elements for energy efficient power savings.

Referring next to FIG. 5, an embodiment of processing elements capable of thread consolidation is illustrated. As depicted, there are four cores (i.e. cores 501-504). Each of the cores having two hardware thread slots (e.g. core 501 having hardware threads 501T0 and 501T1) for a total of eight hardware threads. When referring to a processing element, the reference, in some of the embodiments described herein, is in regards to processors, processing devices, cores, threads, or a combination thereof. As a first illustrative example, consolidation to one or more processing element refers to consolidation to cores. In contrast, processing element may refer to activity/utilization of hardware threads either individually, grouped (e.g. on a core by core basis), or collectively. Therefore, even though the discussion of FIG. 5 is in reference to consolidation of workload on a subset of cores in regards to hardware thread utilization, consolidation and utilization may be in reference to any known processing element. As depicted, cores 501-504 are capable of executing eight software threads; two per core on hardware threads 501T0,T1-

504T0,T1. In other words, hardware threads 501T0,T1-504T0,T1 are capable of simultaneously holding contexts for eight software threads.

In one embodiment, consolidation module 510 is adapted or configured to determine/detect software thread consolidation opportunities. As stated above, in one embodiment, a simplistic determination algorithm is used. Here, thread consolidation module 510 looks for open, hardware thread slots. For example, based on a small or specific temporal sampling, assume software threads 550, 551, 552, and 553 are executing on (or associated with) hardware threads 501T0, 502T0, 503T0, and 504T0, respectively. As a result, thread slots 501T1, 502T1, 503T1, and 504T1 are available (either through hardware, firmware, software, or a combination thereof). And since each core is capable of handling two software threads, then the current workload is capable of being consolidated on two cores (e.g. migrated to cores 501 and 502). Once the workload is offloaded from cores 503 and 504, then they are powered down to conserve energy.

However, in another embodiment, thread consolidation module 510 makes a more in-depth determination based on any number of factors, such as processing element availability, processing element activity, thermal ramifications of consolidation, power consumptions increase/decrease from consolidation, core/thread activity from thread consolidation, frequency increase/decrease from consolidation, etc. Thread consolidation module 510 may take any known form (e.g. hardware, firmware, software, or a combination thereof). As an example above indicated, consolidation module may also take input from a variety of sources, such as hardware, privileged hypervisor scheduler 515 (e.g. and OS or Virtual Machine Monitor), software threads themselves, power module 530, etc. And as the sources vary, so might the makeup of thread consolidation module spread over the boundaries of hardware, firmware, and software. As an illustrative example, hardware gathers utilization and activity information, firmware presents the information to an OS scheduler that makes a migration/consolidation decision based on the factors stated above, the OS communicates the decision back to migration hardware (e.g. a physical core that is having its workload migrated to another core) and power control firmware that performs with hardware the migration/consolidation and powering down consistent with the software decision.

In one scenario, consolidation module 510 (whether implemented in hardware, firmware, software, or a combination thereof) is to determine if consolidation of threads 550-553 into a subset of active cores, such as subset of cores 570, is at least energy efficient. As can be seen from FIG. 5, consolidation module 510 is not limited to making a single subset consolidation determination; although it may in some circumstances. In other words, threads 550-553 may be consolidated to two cores with all thread slots 501T0,T1-502T0,T1 becoming occupied, as long as thread slots 501T0,T1-502T0,T1 are able to accommodate the extra work and the result would be associated with better power consumption, as well as potentially better performance (i.e. closer proximity of interrelated threads and shared data). Here, it's up to the migration module 520 to make such a determination. Or they may be consolidated from four cores to three cores (e.g. 501-503) with some available thread slots. Therefore, even though the discussion below is primarily in reference to a single consolidation determination; the same methodology may be performed iteratively or in parallel over different subsets of processing elements. And the results (e.g. energy efficiency and performance impact, such as the latency introduced to actually migrate threads) may be used to decide if no consolidation should be performed or which consolidation (e.g. which subset is the most energy efficient) should be performed.

In regards to energy efficiency, any known method of determining or estimating energy efficiency may be utilized. In a most basic scenario, assuming frequency is constant, the amount or degree of workload is able to be utilized to determine power consumption. Here, the power saved by consolidating threads 550-553 is seen through the powering down non-subset of active cores 575, while the same workload of the entire processor 100 is constant. Yet, in most processors (or OS environments), when more work is accumulated onto a core, such as core 501, its frequency (or current) is increased to accommodate the greater workload. And as current/frequency increases for core 501, so does its power consumption. Therefore, in this case, the question of energy efficiency becomes whether powering down cores 503 and 504 (e.g. non-subset of active cores 575) saves more power than the increase of power consumption of cores 501 and 502 from the accumulated workloads of threads 552 and 553.

As a quick aside, it's important to note that in some embodiments, energy efficiency may not be the only factor in determining whether consolidation is appropriate. In fact, as the example above (consolidation when thread slots are available) indicates, energy efficiency may not even be a factor in the decision. So continuing the scenario above (where power consumption is compared between consolidation and no consolidation), other factors may be taken into account, such as thermal restraints (e.g. core 501 or 502 being too hot, which result in a consolidation not being performed even if it would be energy efficient).

In one embodiment, thread consolidation module 510 includes an activity (or utilization) module to determine a current activity metric (e.g. a processing element activity, such as core or thread activity). In one case, during a period of time (or period of cycles) it's determined how many cycles a processing element is active. For example, over a 1000 cycle period, it's determined how many cycles hardware thread 501T0 is active (issuing instructions, in active state, or other form of measuring thread or core activity). Note that activity (or processing element utilization) may be expressed in absolute (e.g. number of cycles active) or relative terms (e.g. percentage of cycles active over the total number of cycles in the time period). Hardware counters and/or storage facilities, in one embodiment, track such activity. However, firmware or software may also be used.

From the current activity metric (e.g. thread utilization), an estimated utilization for consolidation is determined. In other words, it's extrapolated what the current workload (executing threads 550-553 and the utilization/activity they are generating) would look like accumulated on the subset of active cores 570. Note from above that this estimation may be performed on any range or number of subsets within a set of active cores (e.g. accumulation to two cores—501,502—or to 3 cores—501-503). Based on this estimated utilization, it's determined if the consolidation to subset of active cores 570 would increase or decrease power consumption (i.e. whether the consolidation would be energy efficient). Barring no increase in frequency or current, then without an increase in workload, it may be assumed that the power consumption for a core would remain relatively the same. And so relegation of threads 552, 553 to cores 501,502 and powering down of cores 503, 504 may be considered energy efficient.

However, thread consolidation module 510, in some embodiments, does not have control over setting frequencies for cores. Instead, other hardware or software, such as privileged hypervisor 515, sets such operating points. As an example, hypervisor 515 has frequency steppings associated with activity thresholds, so higher activity utilizes higher frequency. To illustrate, assume core 501 is capable of operating at 3 GHz. Hypervisor 515 associates 3 thresholds (e.g. 25%, 50%, 75%) with frequency steppings (e.g. above 25% is 1 GHz, above 50% is 2 GHz, and above 75% is 3 GHz). So imagine a scenario where core 501 executing software thread 550 on hardware thread 501T0 is operating at 40% thread utilization (e.g. 501T0 is active 40% of the cycles over a period of time). If thread 552 is consolidated to core 501 and an estimate of thread utilization for core 501 with the additional workload increases beyond the 50% threshold, then hypervisor 515 would increase core 501 frequency from 1 GHz to 2 GHz, which may drastically increase power consumption. Therefore, the question becomes whether the increase in power consumption from consolidation would be less than the power savings from powering down cores 502, 503 after migration.

Consequently, in some embodiment, it's first determined if consolidation to subset of active cores 570 would result in an increase in frequency. If not, then as above, it may be assumed that power consumption would not significantly increase on subset of active cores 570. Or at least it's assumed that any increase in power is outweighed by the potential of powering down non-subset of active cores 575. Alternatively, if the increase in thread utilization (as estimated) would cause an increase in frequency of subset of cores 570 (i.e. the estimated utilization exceeds an activity threshold from an OS or other hypervisor), then the process of estimating power consumption of the subset of cores 570 versus the current power consumption is entertained. In other words, a fast path for consolidation is created. If the estimated thread utilization for subset of active cores 570 as compared to an activity threshold indicates that there is no increase in frequency, a consolidation opportunity is identified without having to encounter a slow path (more in-depth estimation of current power consumption versus estimated power consumption after consolidation, which may take into account the scalability factor for frequency for each active workload).

Yet, even in the slow path, power consumption may not be the only concern, as alluded to above. For example, assume it's determined that consolidation of workload 550-553 to subset of cores 570 would reduce power consumption from the current state. But the reduction in power consumption is small in comparison to the amount of latency introduced in threads 552-553 during migration. So, thread consolidation module 510 and/or hypervisor 515 forgoes the consolidation opportunity to ensure a minimum performance guarantee for software threads 552-553, even though the consolidation may have saved a small amount of power. In other words, in some embodiments, identification of a consolidation opportunity is treated as a consolidation hint, which is either taken or not taken based on designer implemented algorithms/policies that take into account any number of factors.

As a specific illustrative example, equation 1 below provides an embodiment of an algorithm to determine estimated thread utilization from a current thread utilization.

Estimated Thread average Utilization    Equation 1

Estimate Threads average Utilization $\%_m =$

-continued $$\sum_{0}^{R} n \frac{\text{Thread Utilzation }\%_n}{\left(1 + S_n * \frac{(OperationSystemnewFrequancy - OringalFrequancy)}{OrignalFrequancy}\right)} *$$

$$R/(N*M)$$

Here, R represents the number of the original active physical threads, M is the number of cores (e.g. subset of active cores 570 the workload is to be consolidated to, such as 2 in the illustration), N is the number of threads per core (e.g. 2 creating a denominator of the total number of threads in the subset 570 of 4), and the sum of the current thread utilization includes the current thread utilization of all the active processing elements (e.g. if each of threads 550-553 are utilizing 30% of cores 501-504 then the total sum thread utilization is equal to 120%). Assuming the example above and ignoring the parameters of S and the frequency ratio for a moment, a new/estimated thread utilization would be equal to 30%. Since, the same estimated thread utilization would exist (no increase in frequency since the workload has not changed), then consolidation may occur. However, in another embodiment, the type of code plays a factor in the estimate of thread utilization. For example, code scalability affects utilization. Under the assumption that scalability factor is defined by Equation 2.

Scalability Factor                                          Equation 2

$$S(frequancy) = \frac{d\text{Performance}}{d\text{Frequancy}} \frac{newFrequancy}{NewPerformance}$$

And so the linear assumption in this scenario is represented in Equation 3 below.

NewPerformance(NewFrequency)≈OringalPerformance+S(Frequency)* OrignalPeformance/OrignalFrequency* (NewFrequency−OringalFrequency)

Equation 3: New Performance Estimation

So parameter Sn, in one scenario, is introduced to compensate for such scalability. To illustrate, low scalability code will be close to 0 and high scalability will be close to 1, with other levels of scalability ranging therein. Note that the predication of the scalability factor will be done by the hardware Continuing the example above, with a scalability factor high, 1, then the 30% average thread utilization increases to 60% utilization in case of cutting the number of physical thread by 50% without changing the operate frequency. Here, thread consolidation module 510 individually or in combination with other modules, such as hypervisor 515, compares the utilization threshold of 60% with activity thresholds for frequency. And if the estimated utilization exceeds the threshold, its determined that frequency is to increase. From that determination, it's further determined if the increase in frequency would lead to an increase in power consumption beyond the current power consumption. In other words, if the consolidation to subset of active cores 570 is energy inefficient. If there are no energy savings to be had, then the consolidation is not performed.

Otherwise the consolidation is performed barring any other factors (e.g. thermal or performance) that don't preclude the consolidation. Also note that equation 1 is normalized by the ratio of frequency change by the operation system into the start point frequency level. In this scenario, average or estimated thread utilization is expressed in terms of percentage of frequency utilized. For example, assume the estimation includes a new frequency of 2 Ghz under scalability factor that is close to 1 and a processor with an average utilization of 60% is at a 1.5 Ghz level, then the new possible target frequency expressed as an average of 48%. And further assuming a reduction from 4 threads to 2 threads will increase the utilization to the level of 84%. As a result, the threshold comparison may also take the form of frequency comparison instead of percentage activity comparison, as described above.

Once it's determined that an increase in frequency would occur if consolidation of threads 550-553 to cores 501, 502 (subset 570) was carried out, then power consumption increase or decrease is determined/estimated. Any known energy/power estimation techniques may be utilized. For example, when it's estimated that frequency is to increase, then the increased frequency estimate is extrapolated into power consumption for cores 501,502. And that extrapolated power consumption is compared to the current power consumption for determining if consolidation would save power on a large scale perspective (e.g. from the view of the entire processor, integrated circuit, package, and/or platform).

Once a consolidation opportunity is identified and consolidation is determined to go forward, migration module 520 is to migrate threads 550-553 to subset of cores 570. Although pictured separately, in one embodiment, migration module 520 overlaps and/or is included within an OS scheduler 515. In either case, migration includes copying and/or moving context information for software threads 552, 553 out of hardware threads 503T0, 504T0 to available hardware threads 501T1, 502T2. Note from above that this migration cost (i.e. latency introduced for migrating contexts) may be taken into account in the policy and/or algorithm in determining whether consolidation should proceed.

Yet once the migration occurs, cores 503, 504 are free (or idle). So they may be powered down (e.g. clock gated, power gated, reduced clock, reduced power, a combination thereof, etc.) by power module 530 to achieve the energy efficiency and power savings. As an example, power module 530 includes a power control unit (PCU). The PCU, in one embodiment, comprises a microcontroller and co-located power code. Here, once core 503, 504 are idle, the idleness is reported to PCU 530, such as by a request from hypervisor 515 to power them down or hardware/firmware/software indicating a power down in response to the consolidation. And as a result, the PCU places cores 503, 504 into a low power state, which may include any range of lowering or gating clocks, frequency, voltage, etc. to the cores. Consequently, the same workload previously executing on the processor is still executed with the same efficacy. However, power is saved through the opportunistic powering down of non-active cores. And thread consolidation module 510 continues to look for further consolidation opportunities during runtime to create even more power savings.

Figure 6:
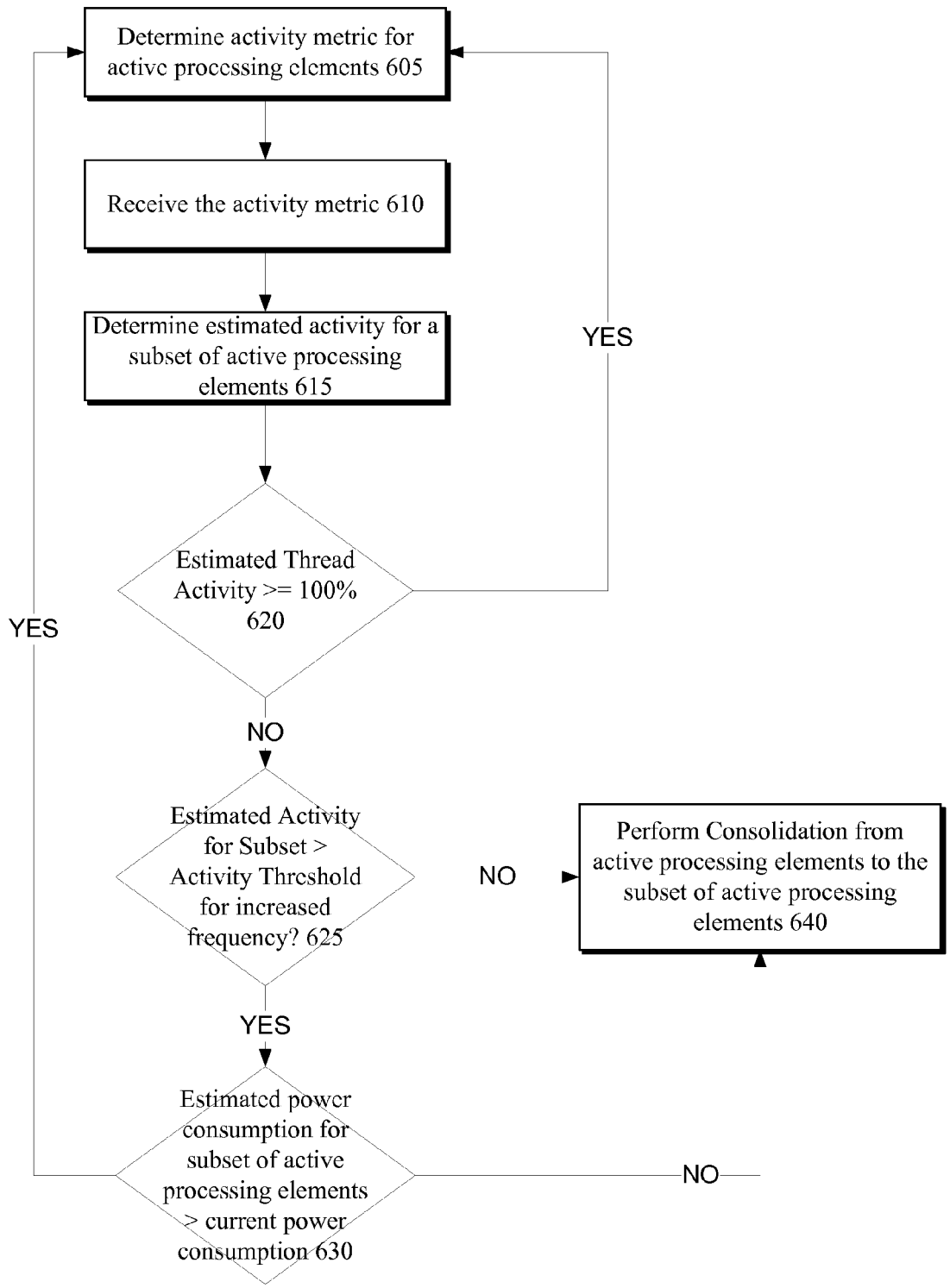
FIG. 6 illustrates an embodiment of a flow diagram for efficiently performing thread consolidation.

Moving to FIG. 6, an embodiment of modules and/or a representation of a flow diagram for a method of consolidation threads is shown. Note that the flows (or modules) are illustrated in a substantially serial fashion. However, both the serial nature of these flows, as well as the depicted order, is not required. For example, in reference to FIG. 6, a determination of whether frequency is to be increased in flow 620 may not be specifically performed in some implementations. Instead, it may determined each iteration if the consolidation opportunity under test would result in increased power consumption through estimating consolidated power consumption in flow 630. Also, the flows are illustrated in a substantially linear or serial fashion. However, the flows may be performed in parallel or in a different order. In addition, any of the illustrated flows or logical blocks may be performed within hardware, software, firmware, or a combination thereof. As stated above and below, each flow, in one embodiment, represents a module, portion of a module, or overlap of modules. Moreover, any program code in the form of one or more instructions or operations, when executed, may In flow 605, an activity metric for a plurality of active processing elements (e.g. processors, cores, threads, etc) is determined. For example, hardware determines a number of cycles that each processing element of the plurality of processing elements is active. And the number of cycles or percentage of cycles over a total number of measured cycles (a percentage utilization) is summed to determine a current, total processing element utilization.

The representation of an activity metric (either in cycles, percentages, or other form) for the plurality of active processing elements is received. For example, hardware counters, registers, or accumulators are used to track active cycles. And at the end of a period, software polls the hardware to retrieve and receive the cycle counts. Then the software performs the calculation to determine the actual representation of activity. However, this is purely an illustrative example, as any of the flows herein may be performed in hardware, firmware, software, or a combination thereof.

Based on the received and/or calculated current activity metric for the plurality of active processing elements, it's determined if a consolidation of a workload from the plurality of active processing elements to a smaller number of the active processing elements (e.g. a subset) includes an increase in frequency in flows 615-625. In one embodiment, an estimated (new) activity metric for the smaller number (subset) of the active processing elements is determined in flow 615 from the current activity metric. For example, equation 1 from above (or a variant thereof) is utilized to calculate/estimate what a new, average activity metric would be after consolidation. Note that the new, average utilization may be expressed in any manner (e.g. number of cycles, percentage, amount of frequency, or other known representation of processing activity).

In flow 620, if the new, average utilization is above 100%, then the consolidation attempt is aborted and more consolidation opportunities are sought in a return to flow 605. In other words, if utilization would be more than the subset of cores would be able to handle (utilization greater than 100%), then the attempt is aborted, since it may drastically increase power consumption and/or substantially adversely affect performance.

Yet, if the estimated thread activity/utilization is less than 100%, then it's determined in flow 625 if the new estimated activity metric is above a privileged level software activity threshold for requesting an increase in frequency. For example, an Operating System (OS) policy may include certain utilization thresholds to request more frequency (or more performance). To illustrate, assume OS code includes a threshold of 90% utilization to request a turbo frequency (or maximum current). If the consolidation would result in an estimated utilization over 90%, then it's determined that frequency on the subset of cores to accumulate the workload would be increased. However, if the new estimated utilization is below the turbo mode threshold, such that it would maintain or decrease frequency from the current utilization, then in flow 625 the consolidation is performed. In other words, if the new, estimated, average utilization doesn't cross any threshold utilization that would cause an increase in the current frequency, then it's assumed that consolidation will save power without having to actually estimate power consumption after the consolidation.

Yet, if frequency is to increase after consolidation, as determined in flow 625, then in flow 630 it's determined if the increase in frequency would lead to an increase in power consumption. In other words, if the consolidation of the workload from the plurality of active processing elements to the subset of processing elements would actually result in a decrease in power consumption. If the power consumption would increase (i.e. the consolidation would not be power efficient or energy efficient), then the consolidation opportunity is aborted and the flow returns to 640 as above. However, if the power consumption would decrease after consolidation (i.e. the consolidation would be power efficient or energy efficient), then the consolidation is performed in flow 640. As an example, software threads from the non-subset of active cores (i.e. cores to be powered down) are migrated to the subset of active cores. As an illustrative example, migration logic may include storage coupled in a cross-bar configuration to the processing elements of a processor, such that any hardware thread context may be migrated/switched quickly and efficiently into another hardware thread; even between cores.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
  a first number of hardware processing elements to execute a second number of software threads;
  a consolidation module adapted to determine during runtime if consolidation of the second number of software threads to a subset of the first number of hardware processing elements is energy efficient in response to the second number being smaller than the first number, and including;
   an activity module adapted to determine a current activity metric for the first number of hardware processing elements during runtime;
   a utilization module adapted to determine if the current activity metric consolidated to the subset of the first number of hardware processing elements would increase power consumption; and
   a control module adapted to determine that the consolidation is energy efficient in response to determination that the consolidated current activity metric would not increase power consumption, and to determine that the consolidation is not energy efficient in response to determination that the consolidated current activity metric would increase power consumption; and a migration module adapted to migrate the second number of software threads to the subset of the first number of hardware processing elements in response to determination that the consolidation of the second number of software threads to the subset of the first number of hardware processing elements is energy efficient.

2. The processor of claim 1, wherein the first number of hardware processing elements includes M cores, and wherein the M cores are to include N hardware threads, N being greater than or equal to M.

3. The processor of claim 1, wherein the utilization module is adapted to:
determine if the current activity metric consolidated to the subset of the first number of hardware processing elements would cause a policy for frequency stepping to increase frequency for the subset of the first number of hardware processing elements;
determine that the consolidated current activity metric would not increase power consumption in response to determination that the consolidated current activity metric would cause the policy for frequency stepping to not increase frequency for the subset of the first number of hardware processing elements; and
determine if the current activity metric consolidated to the subset of the first number of hardware processing elements would cause an increase in estimated power consumption in response to determination that the consolidated current activity metric would cause the policy for frequency stepping to increase frequency for the subset of the first number of hardware processing elements.

4. The processor of claim 1, wherein the migration module is to copy and move context information for software threads of the second number of software threads from hardware processing elements of the first number of processing elements not within the subset of hardware processing elements to the subset of hardware processing elements.

5. The processor of claim 4, further comprising a power module adapted to place the hardware processing elements of the first number of processing elements not within the subset of hardware processing elements into a low power state after the copy and move.

6. The processor of claim 1, wherein the consolidation module is to determine whether the consolidation is energy efficient based at least in part on an estimate of a power effect of the consolidation.

7. The processor of claim 1, wherein at least one of the software threads is to provide a hint as to thread activity in a future time quantum.

8. The processor of claim 1, wherein the consolidation module is to determine an estimated thread utilization from a current thread utilization.

9. The processor of claim 8, wherein the consolidation module is to determine the estimated thread utilization further based on a scalability factor.

10. A non-transitory medium including code, when executed, to cause a machine to perform a method comprising:
receiving a representation of an activity metric for a plurality of active processing elements;
determining if a consolidation of a workload from the plurality of active processing elements to a smaller number of the plurality of active processing elements includes an increase in frequency based on the activity metric for the plurality of active processing elements;
determining if the consolidation of the workload from the plurality of active processing elements to the smaller number of the plurality of active processing elements includes a decrease in power consumption based on the activity metric for the plurality of active processing elements in response to determining the consolidation includes the increase in frequency; and
performing the consolidation of the workload from the plurality of active processing elements to the smaller number of the plurality of active processing elements in response to determining the consolidation does not include the increase in frequency or the consolidation includes the decrease in power consumption.

11. The non-transitory medium of claim 10, wherein the activity metric for the plurality of active processing elements includes a sum of a percentage of cycles each of the plurality of processing elements are active during a period of cycles.

12. The non-transitory medium of claim 10, wherein the method further comprises:
determining an estimated activity metric for the smaller number of the plurality of active processing elements from the activity metric for the plurality of active processing elements;
determining if the estimated activity metric is above a privileged level software activity threshold for requesting an increase in frequency; and
determining the consolidation of the workload from the plurality of active processing elements to the smaller number of the plurality of active processing elements includes an increase in frequency in response to determining the estimated activity metric is above the privileged level software activity threshold for requesting the increase in frequency.

13. The non-transitory medium of claim 10, wherein the plurality of active processing elements are selected from a group consisting of a plurality of hardware threads, a plurality of cores, and a plurality of processing devices.

14. The non-transitory medium of claim 10, wherein the method further comprises performing the consolidation of the workload from the plurality of active processing elements to the smaller number of the plurality of active processing elements without determining if the consolidation of the workload from the plurality of active processing elements to the smaller number of the plurality of active processing elements includes a decrease in power consumption.

15. A method comprising:
determining a new activity metric for a thread consolidation to a subset of a plurality of active processing elements based on a current activity metric for the plurality of active processing elements;
determining if the new activity metric would result in an increase in frequency of the subset of the plurality of active processing elements;
performing the thread consolidation to the subset of the plurality of active processing elements in response to determining the new activity metric would not result in the increase in frequency;
determining if the thread consolidation to the subset of the plurality of active processing elements would result in an increase in power consumption in response to determining the new activity metric would result in the increase in frequency of the subset of the plurality of active processing elements; and
performing the thread consolidation to the subset of the plurality of active processing elements in response to determining the thread consolidation to the subset of the plurality of active processing elements would not result in the increase in power consumption.

16. The method of claim 15, further comprising determining the new activity metric would result in the increase in the frequency in response to the new activity metric exceeding an Operating System activity threshold to increase frequency.

17. The method of claim 15, further comprising migrating threads from non-subset processing elements of the active processing elements that are not within the subset of the plurality of active processing elements to the subset of the plurality of active processing elements in response to determining the new activity metric would not result in the increase in frequency.

18. The method of claim 15, further comprising determining if the new activity metric in combination with an increased frequency for the subset of the plurality of active processing elements would result in a higher power consumption than the current activity metric in combination with a current frequency for the plurality of active processing elements.

19. The method of claim 15, wherein the plurality of active processing elements are selected from a group consisting of a plurality of hardware threads, a plurality of cores, and a plurality of processing devices.

* * * * *